(12) United States Patent
O'Neill

(10) Patent No.: US 8,177,049 B2
(45) Date of Patent: May 15, 2012

(54) CHAIN AND FLIGHT CONVEYOR

(75) Inventor: Michael L. O'Neill, Lucinda, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 605 days.

(21) Appl. No.: 12/062,069

(22) Filed: Apr. 3, 2008

(65) Prior Publication Data

US 2009/0250318 A1 Oct. 8, 2009

(51) Int. Cl.
*B65G 19/24* (2006.01)

(52) U.S. Cl. .......... 198/731; 198/730; 198/733; 198/734

(58) Field of Classification Search .................. None
See application file for complete search history.

(56) References Cited

U.S. PATENT DOCUMENTS

| | | | | |
|---|---|---|---|---|
| 2,761,548 A | * | 9/1956 | Long | 198/733 |
| 4,766,995 A | * | 8/1988 | Sterwerf, Jr. | 198/733 |
| 5,096,048 A | * | 3/1992 | Lachner et al. | 198/733 |
| 5,165,766 A | * | 11/1992 | Thomas | 305/191 |
| 5,213,199 A | | 5/1993 | Braun et al. | |
| 6,662,932 B1 | | 12/2003 | O'Neill | |

FOREIGN PATENT DOCUMENTS

DE 20300239 3/2003

OTHER PUBLICATIONS

Polish Search Report for Application No. P387693 dated May 21, 2009 (2 pages).

* cited by examiner

*Primary Examiner* — Kavel Singh

(74) *Attorney, Agent, or Firm* — Michael Best & Friedrich LLP

(57) ABSTRACT

A chain driven by two sprockets spaced a short distance apart along their common axial centerline. The chain includes elongated pins that extend beyond the outer surfaces of the chain link plates, on both sides, by a distance about equal to the width of the spaced apart sprockets. The chain is aligned midway between the sprockets, and the sprocket teeth drive on the extended portion of the chain pins. Where a flight is attached to the chain links, the pins are extended still further, to fit into the indentations or holes in the flights. This provides an exposed length of each pin in alignment with the sprocket on each side for driving purposes. The chain has a piece extending between the plates to reduce the likelihood of a pin extending further outside of one side plate or the other. A shoulder on the pin further reduces the likelihood of this happening.

39 Claims, 13 Drawing Sheets

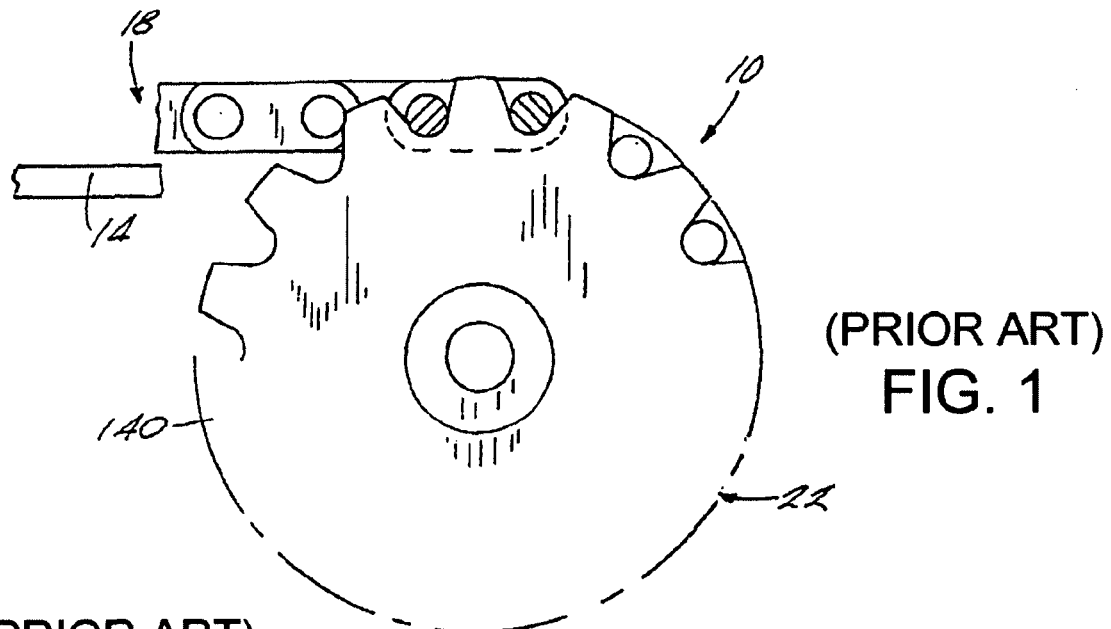
(PRIOR ART)
FIG. 1
(PRIOR ART)
FIG. 3
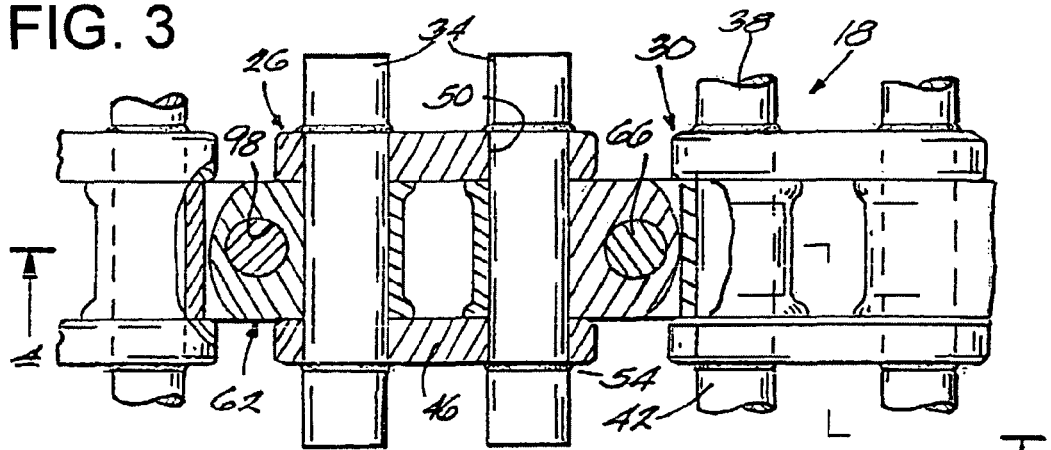
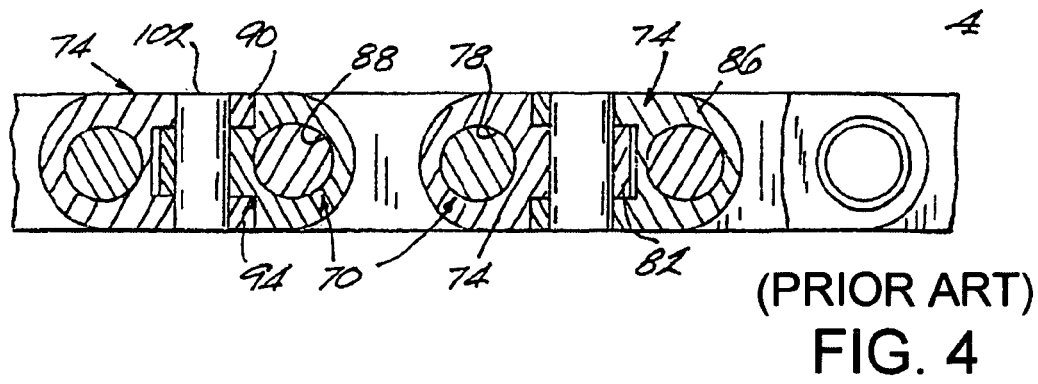
(PRIOR ART)
FIG. 4

CHAIN AND FLIGHT CONVEYOR

BACKGROUND

This application relates to a chain and flight conveyor for use in conveying materials in the mining industry, and, in particular, to an improved design of a chain and flight conveyor having an improved drive sprocket assembly. Still more particularly, this application relates to conveyor chains for continuous miners and chain haulage units.

Conveyor chains for use on continuous miners and chain haulage units must have the ability to flex sideways to allow them to make turns. For this purpose, they include swivel links. Unlike a link from a standard roller or stud-bushed chain, a swivel link cannot be sprocket-driven on its interior, because the space within it is mostly filled with the swivel pin and the lugs that surround the swivel pin. A swivel link can only be sprocket driven on its outer ends.

O'Neill U.S. Pat. No. 6,662,932 ('932 patent) illustrates an improved chain and flight conveyor with swivel links. As illustrated in prior art FIGS. 1 through 4, the '932 chain and flight conveyor 10 includes a pan or conveying deck 14 of, for example, a continuous miner or a shuttle car, and a conveyor chain and flight assembly 18 that travels over the pan 14. The conveyor 10 also includes a sprocket drive 22.

More particularly, as shown in FIGS. 3 and 4, the conveyor chain and flight assembly 18 includes a first link assembly 26 and a second link assembly 30, each of which includes two spaced apart drive pins 34, each of which has a first end 38 and a second end 42. Still more particularly, the chain and flight assembly 18 is formed from a plurality of alternating first link assemblies 26 and second link assemblies 30. Each link assembly also includes two spaced apart side plates 46, each of which has two spaced apart openings 50, each opening 50 receiving a different one of the drive pins 34. Drive pin retaining means in the form of press-fitting retains the drive pins 34 in the side plates 46. The conveyor chain and flight assembly 18 also includes a swivel assembly 62 connecting the two link assemblies 26 and 30, the swivel assembly 62 including a swivel pin 66, a male connecting lug 70, and a female connecting lug 74.

More particularly, the male connecting lug 70 has a base 75 with a horizontal bore 78 that receives one of the drive pins of the first link assembly 26, and a tongue 82 connected to the base 75. The female connecting lug 74 has a base 86 with a horizontal bore 88 that receives one of the drive pins of the second link assembly 30, and a spaced apart upper lip 90 and lower lip 94 connected to the base 86. The male connecting lug tongue 82 extends between the spaced apart lips 90 and 94, each of the lips and the tongue having openings therein that form a bore 98 through the male and female lugs that receives the swivel pin 66. Swivel pin retaining means in the form of a weld retains the swivel pin 66 in the lugs 70 and 74.

The conveyor chain and flight assembly 18 also includes a first flight 110 (see FIG. 2) connected to one of the first and the second link assemblies, the flight 110 having a flight head 114 having two spaced apart indentations 118 and 120, each of which receives a different one of the first ends of the drive pins 34. The conveyor chain and flight assembly 18 also includes first flight securing means retaining the drive pin first ends in the first flight head so that the first flight head is spaced from its respective side plate. More particularly, the drive pin first ends are press-fitted or welded to the first flight head 114. Still more particularly, a pair of such first and second flights is connected to each of the second link assemblies. In other embodiments (not shown), the pair of such first and second flights can be connected to the first link assemblies.

The conveyor chain and flight assembly 18 also includes a second flight 124 connected to the one of the first and the second link assemblies, the flight 124 having a flight head 128 having two spaced apart indentations 132 and 136, each of which receives a different one of the second ends of the drive pins 34. The conveyor chain and flight assembly 18 also includes second flight securing means retaining the drive pin second ends in the second flight head 128 so that the second flight head is spaced from its respective side plate. More particularly, the drive pin second ends are press-fitted or welded to the second flight head 128.

As illustrated in FIGS. 1 and 2, the conveyor chain and flight assembly sprocket drive 22 includes two spaced apart drive sprockets 140 and 144, with each of the drive sprockets engaging the drive pins 34 between the side plates and the side plate's respective flight.

In summary then, the invention is a chain 10 driven by two sprockets 140 and 144 spaced a short distance apart along their common axial centerline (see FIG. 2). The chain 10 includes elongated pins 34 that extend beyond the outer surfaces of the chain link plates 46, on both sides, by a distance about equal to the width of the spaced apart sprockets 140 and 144. The chain is aligned midway between the sprockets 140 and 144, and the sprocket teeth drive on the extended portion of the chain pins 34. Where a flight is attached to the chain links, the pins are extended still further, to fit into the indentations or holes in the flights. This provides an exposed length of each pin in alignment with the sprocket on each side for driving purposes.

The sprockets 140 and 144 are located away from the center of the chain and therefore away from any interference with the swivel link. The sprockets can thus drive the chain on every pitch.

As an alternative to the swivel assembly 62 connecting the two link assemblies 26 and 30, a solid link (not shown in FIGS. 1 through 4) can also provide some limited pivotal movement by providing a loose connection to the link assemblies 26 and 30 by having pin receiving openings that are larger than the pins received in the openings. This permits some limited pivotal movement between the links, serving as a partial swivel joint.

SUMMARY

The disclosed embodiments are an improvement to the above subject matter of the '932 patent. More particularly, while the '932 patent included drive pin retaining means in the form of press-fitting or welding of the drive pins in the side plates, welding has proven to be a difficult procedure, especially for field installations. Press-fitting is more field friendly, but still difficult. What is needed is a way for relatively easy field assembly of the conveyor chain while at the same addressing the following pin movement issues.

A problem encountered with the '932 patent chain has been axial motion of a chain pin, so that the pin extend further from one side of the chain than the other. Because welding has proven to be a difficult procedure, especially for field installations, the pins and link side plates have been joined by press fits. Heavier press fits have been tried and have so far prevented pin movement. However, the heavier press fits have the disadvantage of more difficult chain maintenance.

The mechanism causing pin motion is believed to exist in the underside of the continuous miner conveyor, where the chain moves toward the front of the machine. When the conveyor is hinged sideways, but not to the full extent possible, a gap exists in the side of the conveyor trough. The tension of the chain pulls it sideways in the trough, so that the ends of the chain flights tend to enter the gap. The flights strike the machine frame where the gap ends, and the impact causes the flight section to swivel about the pivoting links. The resulting sideways motion accelerates the side plates transversely, causing relative motion between the side plates and pins.

To prevent this relative motion, a positive retention and field friendly mechanism is needed between the pin and side plate. More particularly, this embodiment provides a piece extending between and connected to the side plates to prevent movement of the side plates away from each other.

This invention provides a conveyor including a pan, and a conveyor chain and flight assembly that travels over the pan. The conveyor chain and flight assembly includes a first link assembly and a second link assembly, each of which includes two spaced apart drive pins, each of which has a first end and a second end, and two spaced apart side plates, each of which has two spaced apart openings, each opening receiving a different one of the drive pins.

In one embodiment, the conveyor chain and flight assembly further includes drive pin retaining means for retaining the drive pins in the side plates. The drive pin retaining means comprises a shoulder on each pin that engages its respective side plate to prevent the side plates, when the side plates engage the shoulder, from moving towards each other.

And in one embodiment, the conveyor chain and flight assembly further includes at least one of the first link assembly and the second link assembly also includes a piece extending between and connected to the side plates to prevent movement of the side plates away from each other.

Further details, embodiments and techniques are described in the detailed description below. This summary does not purport to define the invention. The invention is defined by the claims.

BRIEF DESCRIPTION OF THE DRAWINGS

FIG. 1 (prior art) is a side view with a partial cutaway of a continuous miner conveyor chain with flights and showing the drive sprocket engaging the chain;

FIG. 3 (prior art) is an enlarged view of the partially broken away section of the chain shown in FIG. 2.

FIG. 4 (prior art) is a partial cross-sectional view taken along the line 4-4 in FIG. 3.

Figure 2:
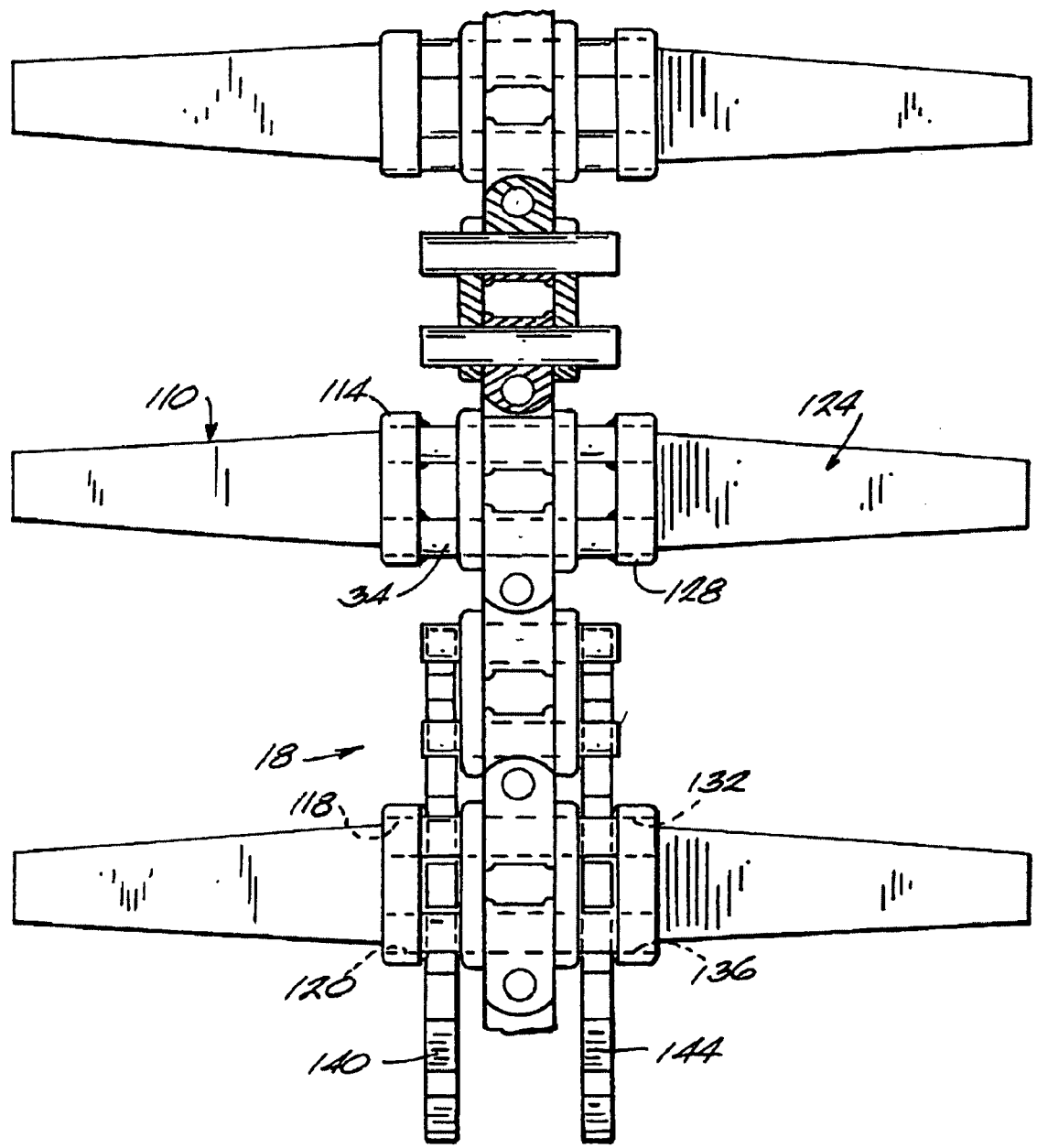
FIG. 2 (prior art) is a plain view of the improved chain and flight conveyor of this invention being driven by the improved drive sprocket of this invention. A portion of one link assembly is broken away.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION OF THE PREFERRED EMBODIMENTS

Figure 5:
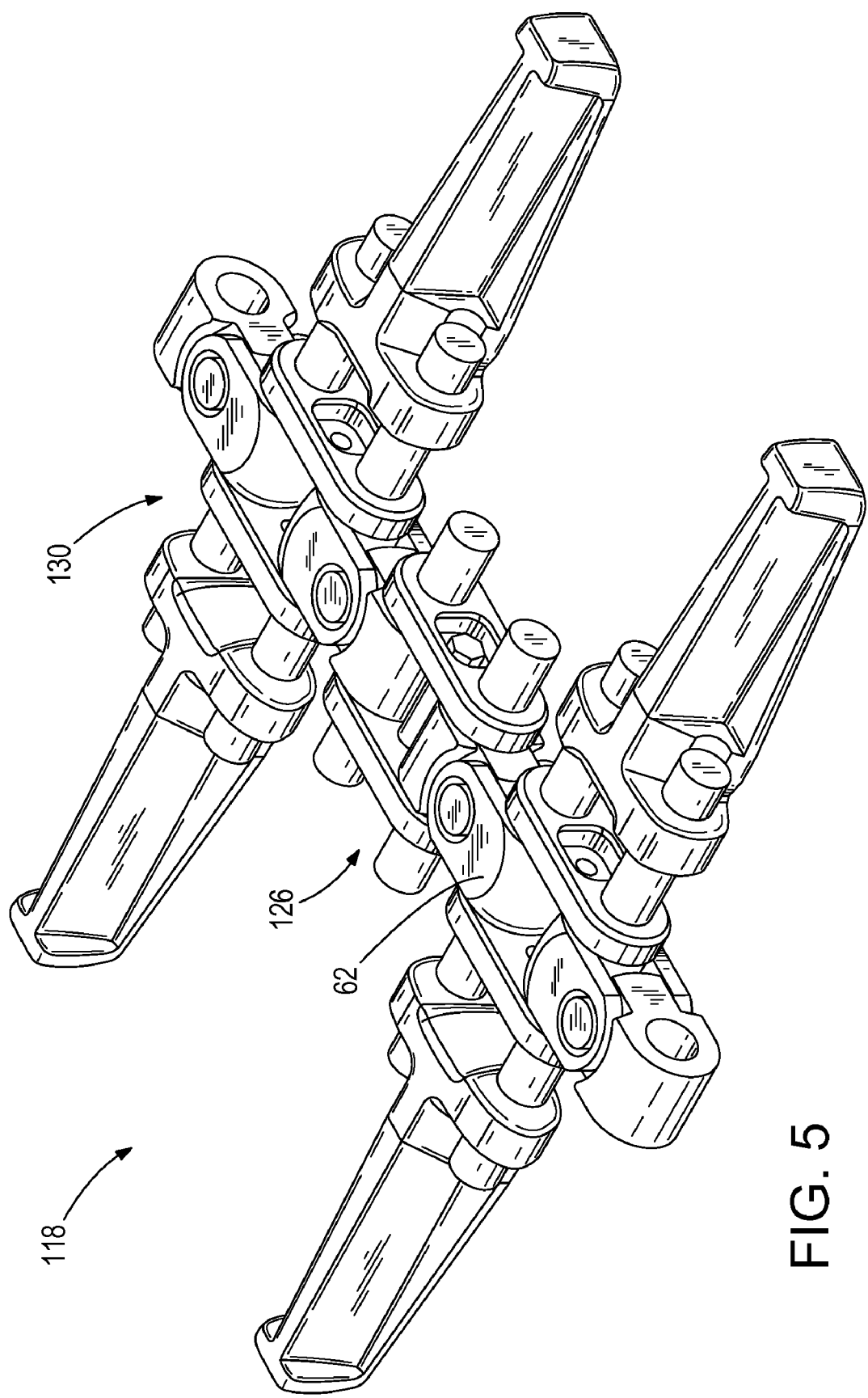
FIG. 5 is a perspective view of a portion of an improved continuous miner conveyor chain with first and second link assemblies and flights attached to the second link assemblies.

The disclosed embodiments are an improvement to the above subject matter of the '932 patent, the description of which is found in the Summary. More particularly, as shown in FIG. 5, the improvement relates to the structure of the first link assembly 26 and the second link assembly 30. Still more particularly, as shown in FIG. 5, the improvement relates to a chain and flight assembly 118 and its use on a conveyor, the assembly including a first link assembly 126 and a second link assembly 130. As before, as shown in regards to the first link assembly 126 in FIGS. 6 through 13, each link assembly also includes two spaced apart side plates 146, each of which has two spaced apart openings 150, each opening 150 receiving a different one of the drive pins 134. The conveyor chain and flight assembly 18 also includes a swivel assembly 62 connecting the two link assemblies 26 and 30, the swivel assembly 62 including a swivel pin 66, a male connecting lug 70, and a female connecting lug 74.

Figure 14:
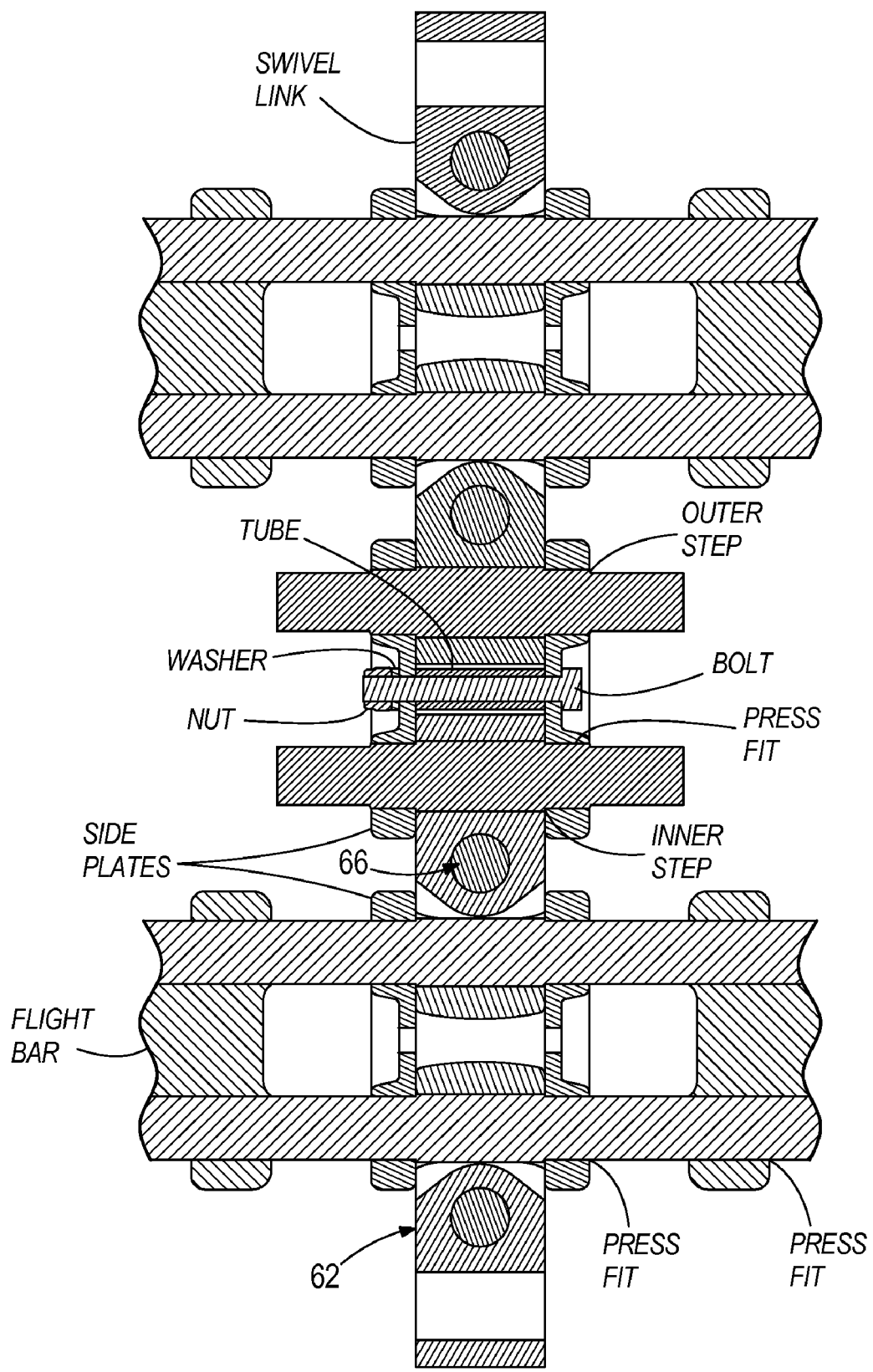
FIG. 14 is a top cross sectional view of a portion of an improved continuous miner conveyor chain, as shown in FIG. 5, with first and second link assemblies and flights attached to the second link assemblies, with a swivel assembly connecting the first and second link assemblies.
Figure 15:
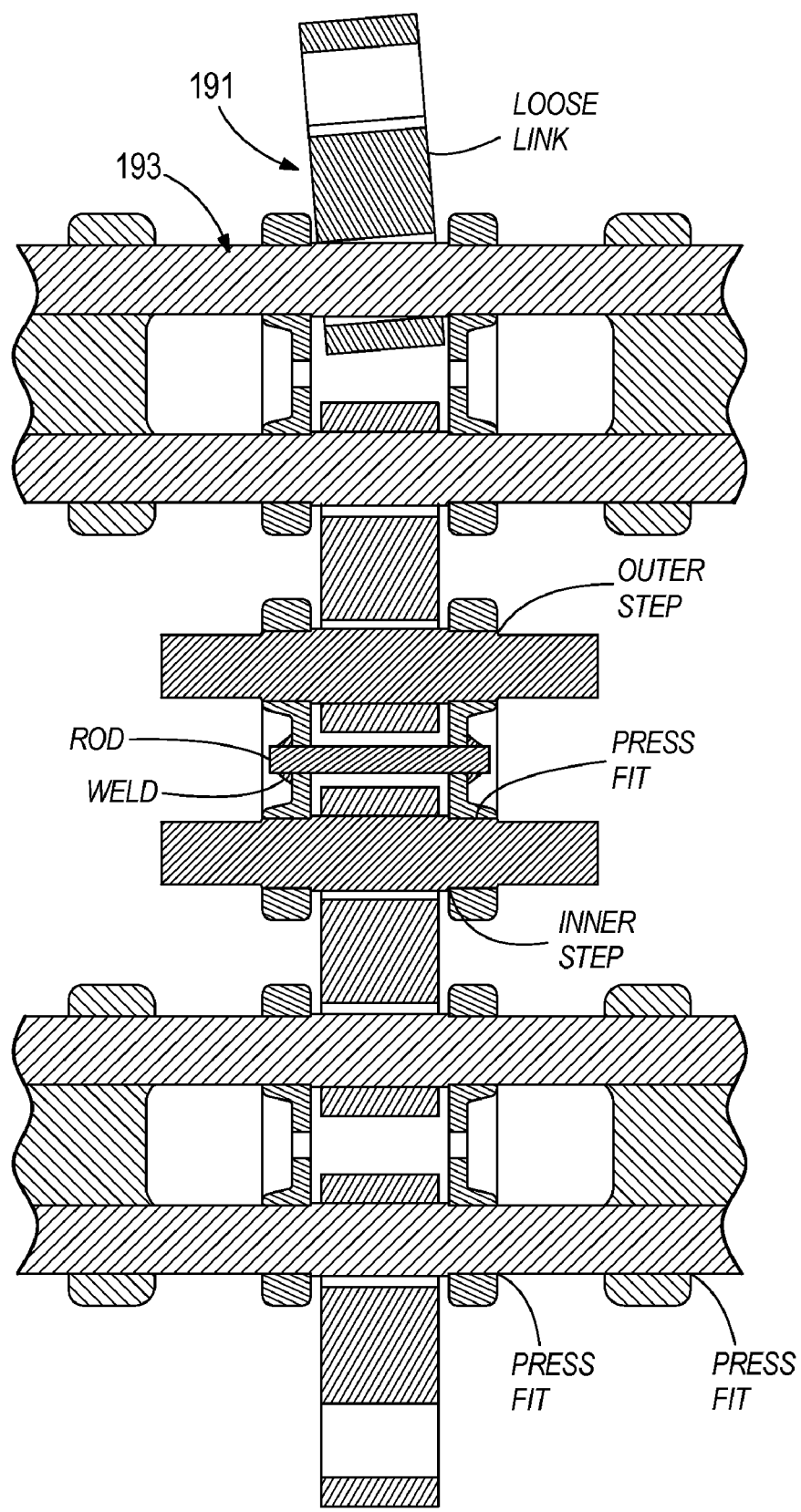
FIG. 15 is another top cross sectional view of a portion of an improved continuous miner conveyor chain with first and second link assemblies and flights attached to the second link assemblies, with a loose link connecting the first and second assemblies.

The improved assembled chain and flight assembly 118 is shown in cross section in FIG. 14. In FIG. 15, another embodiment is shown, where instead of a swivel assembly 62, a solid link 191 is used to provide some limited pivotal movement by providing a loose connection to the link assemblies 126 and 130 by having pin receiving openings that are larger than the pins 193 received in the openings. This permits some limited pivotal movement between the links, serving as a partial swivel joint.

The disclosed embodiments have two areas of improvement over the '932 patent. More particularly, the drive pin retaining means for retaining the drive pins in the side plates is different than in the '932 patent. In this improvement, the drive pin retaining means comprises a shoulder 160 on a pin 161 that engages its respective side plate to prevent the side plates, when the side plates engage the shoulder, from moving towards each other, i.e., the chain center. In one embodiment, as further explained below, the shoulder comprises an abutment or inner step 162 on a pin 163. In another embodiment, as further explained below, the shoulder comprises a taper 164 on a pin 165, and a mating taper 166 in the side plate opening 167.

The other improvement is that at least one of the first and second link assemblies also includes a piece in the form of a bar 170 that extends between and is connected to the side plates to prevent movement of the side plates away from each other. More particularly, the bar can take the form of a tube 172 or spacers 174 and a nut 176 and bolt 178, or a threaded bolt (not shown), and a bar welded to the side plates, as further explained below. In the preferred embodiment, each of the first and second link assemblies includes such a piece. FIGS. 6 through 13 illustrate different embodiments of the first link assembly 126. Similar embodiments of the second link assembly 130 are also part of this disclosure.

More particularly, in one embodiment, as shown in FIGS. 6, 7, 9, 10, 11 and 12, the bar includes a bolt 178 extending transverse between the first and second side plates and received in aligned openings 180 and 182 in the side plates. The bolt 118 has a first end with a head on the exterior of one side plate, and a second threaded end on the exterior of the other side plate. A nut 119 and washer 121 are received on the threaded end. In other embodiments (not shown), the second end of the bolt can be received in a threaded opening in the side plate. As used herein, interior means between the side plates and exterior means outside of between the side plates.

Figure 8:
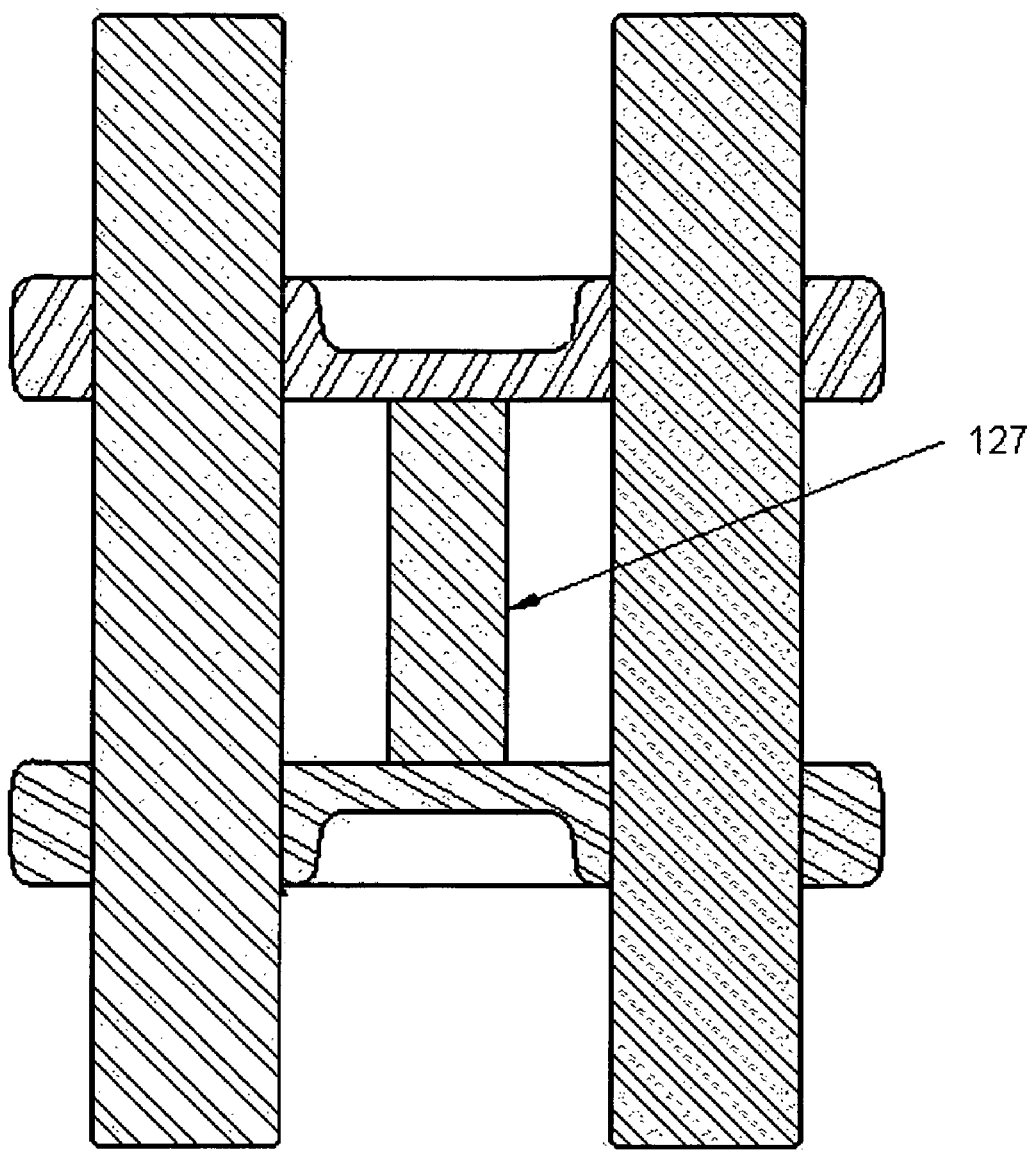
FIG. 8 is a cross sectional view of a third embodiment of the first link assembly.
Figure 13:
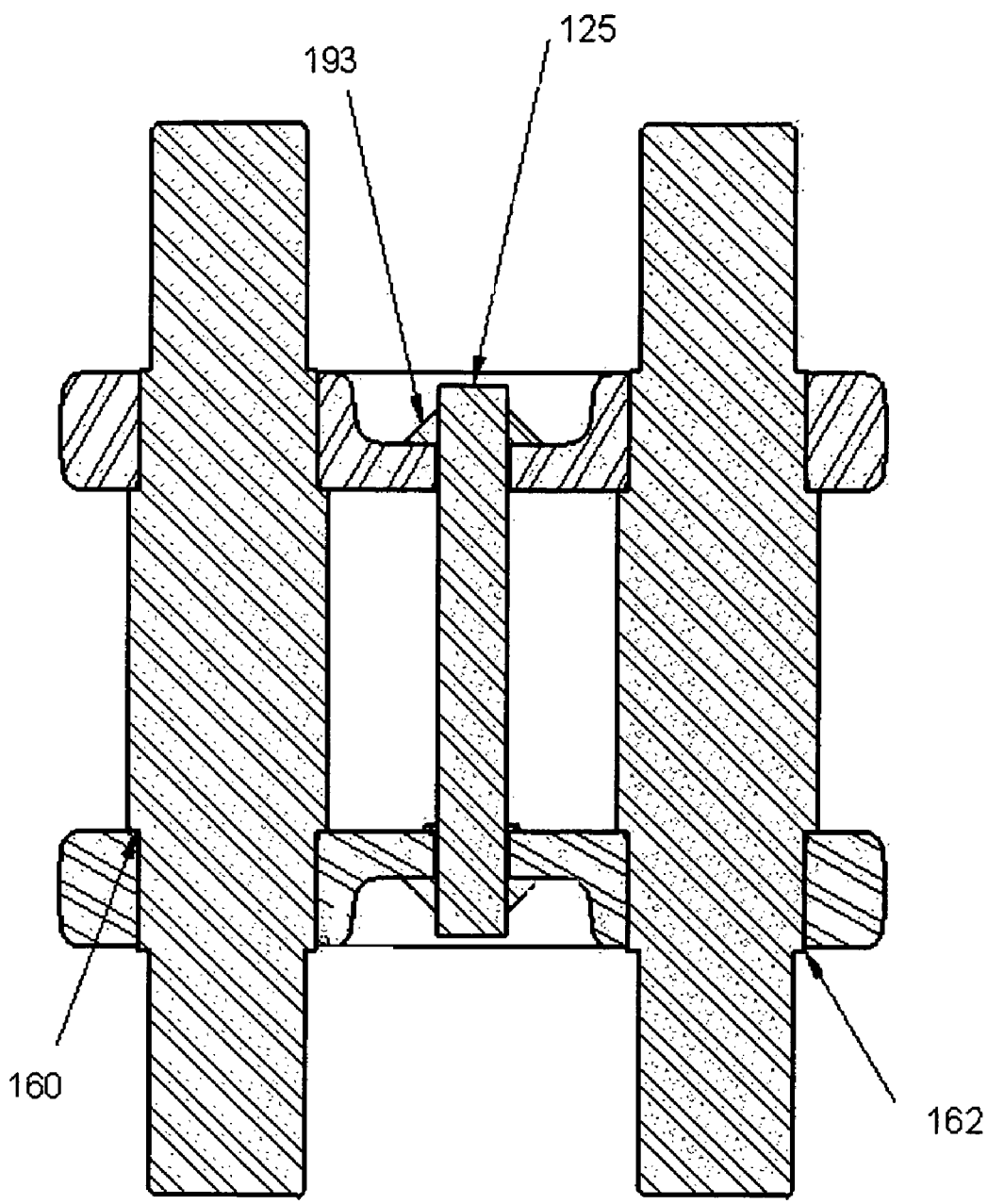
FIG. 13 is a cross sectional view of an eighth embodiment of the first link assembly.

In one embodiment, the bar is in the form of a spacer 123, as shown in FIG. 8, or a rod 125, as shown in FIG. 13, welded 193 transverse between the first and second side plates.

Figure 11:
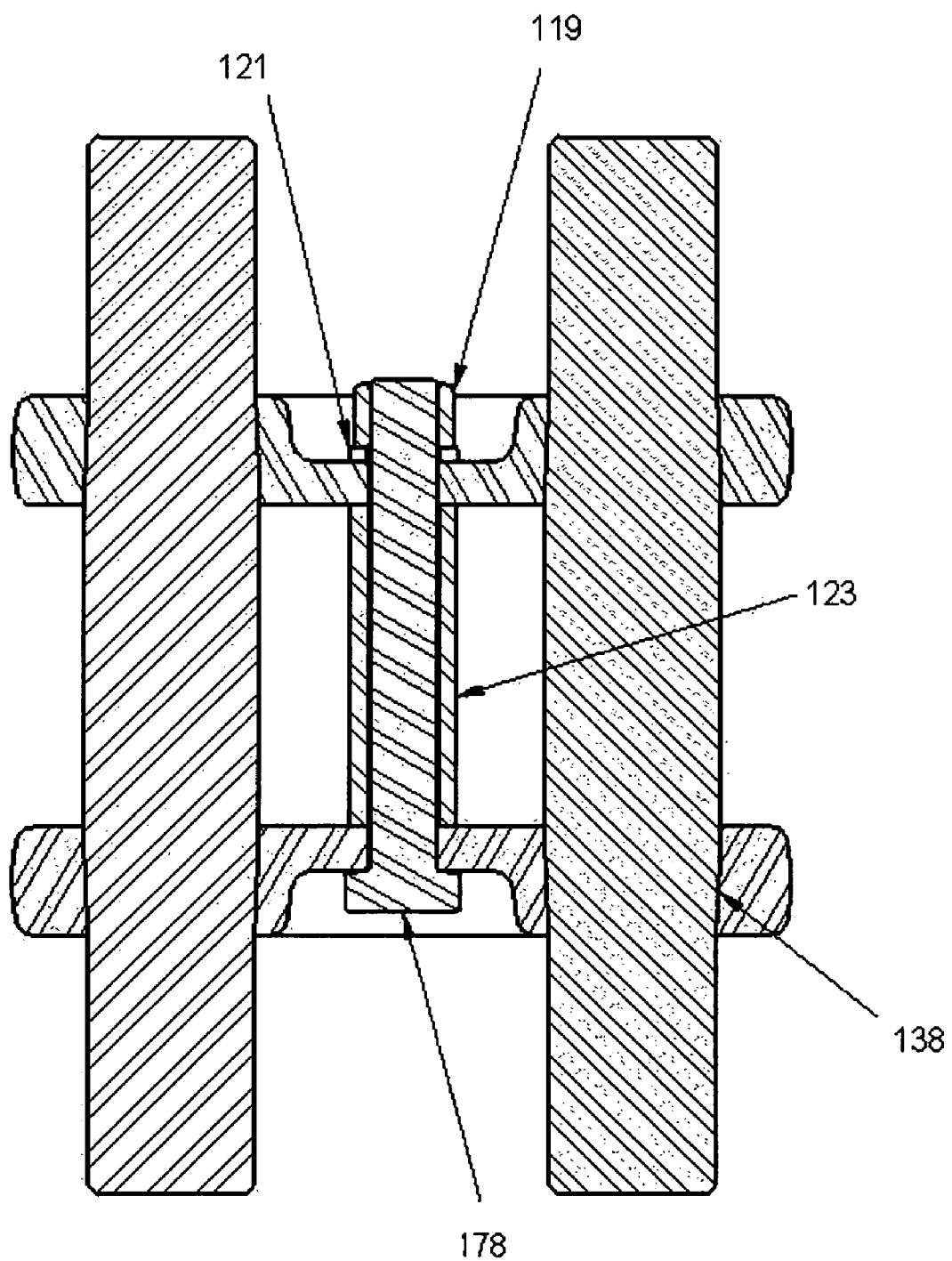
FIG. 11 is a cross sectional view of a sixth embodiment of the first link assembly.
Figure 12:
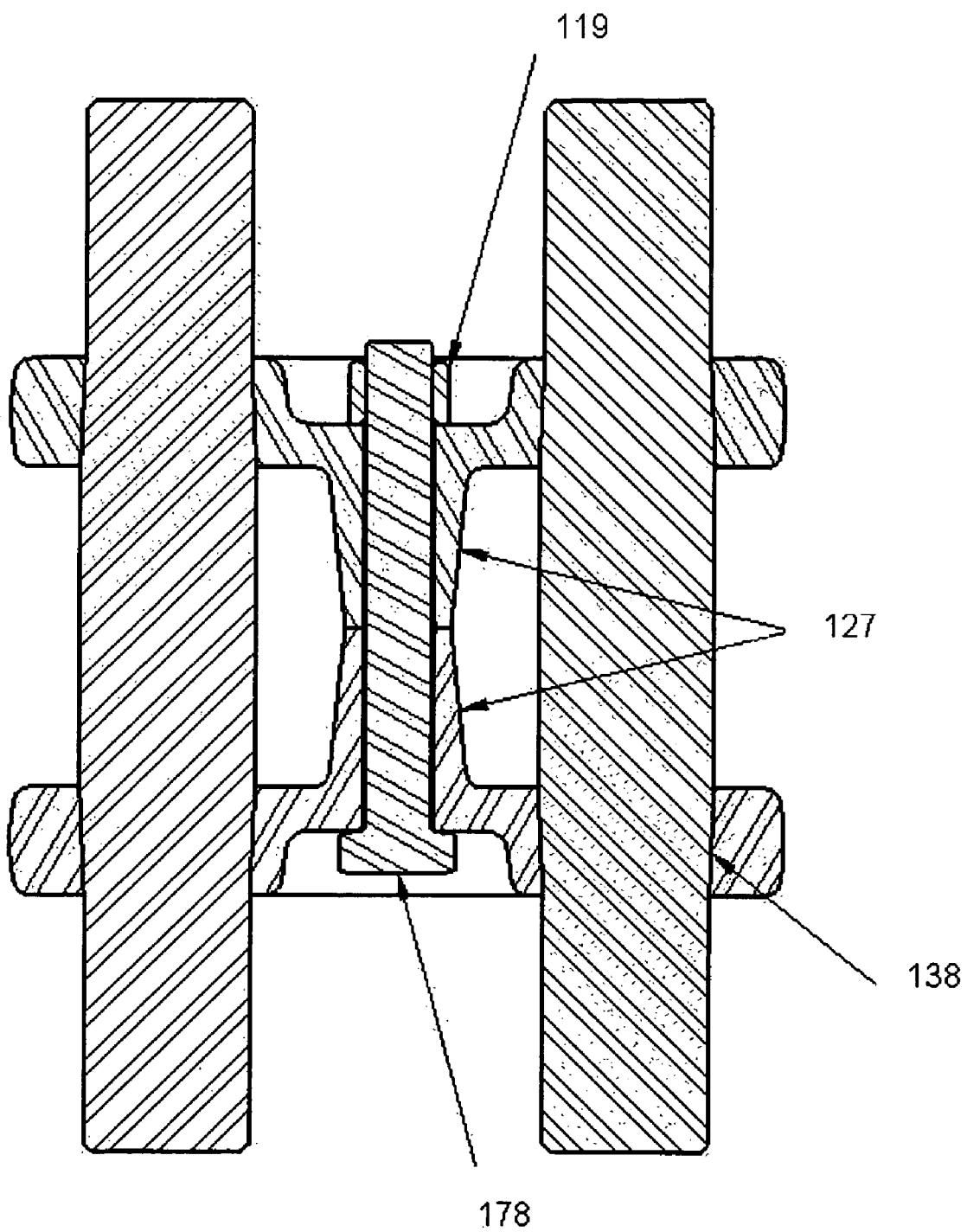
FIG. 12 is a cross sectional view of a seventh embodiment of the first link assembly.

In one embodiment, the bar also includes a tube 123, as shown in FIGS. 6, 7, 9 and 11, or a spacer 127, as shown in FIG. 12, that receives the bolt and that extends transverse between the first and second side plates.

Figure 6:
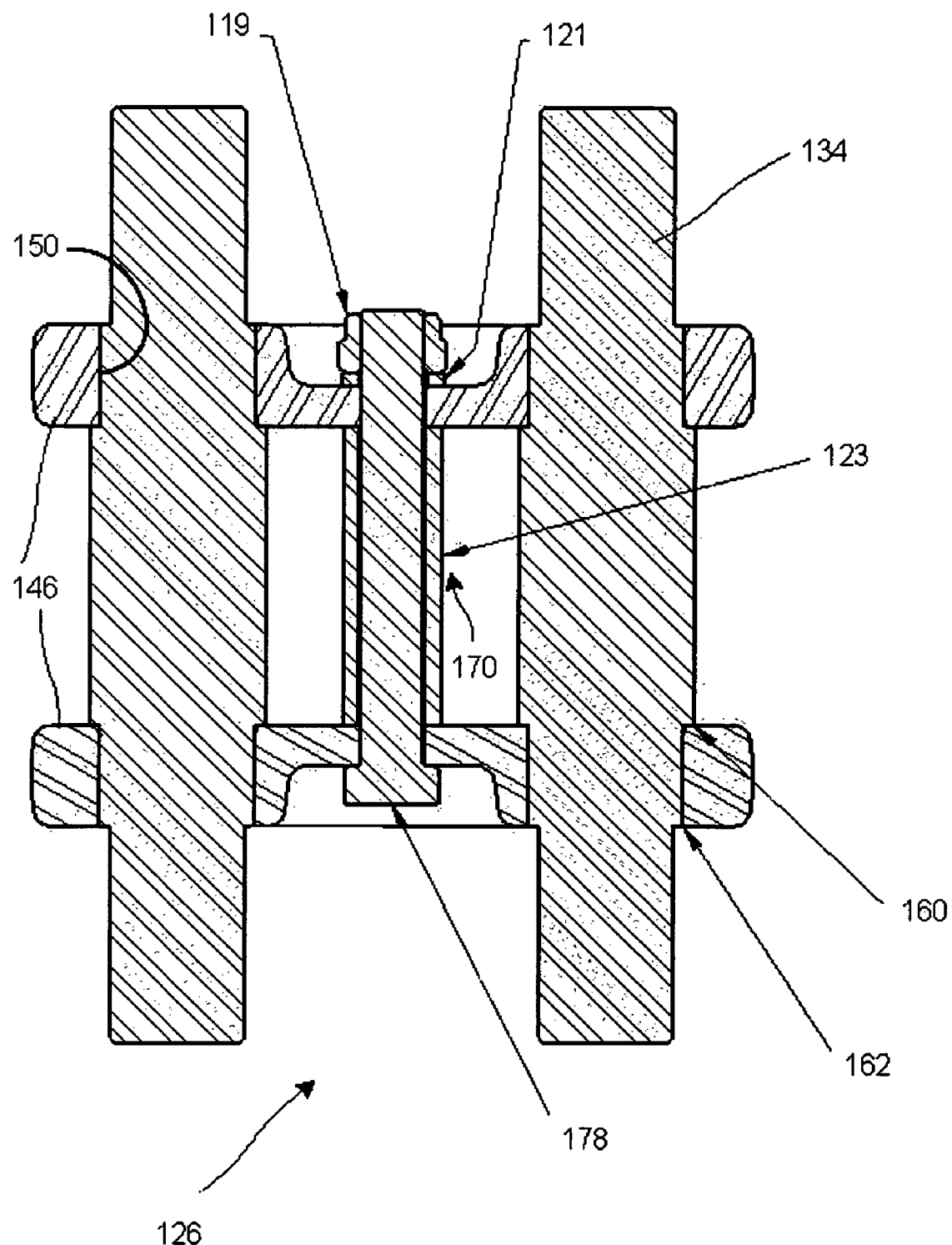
FIG. 6 is a cross sectional view of one embodiment of the first link assembly.

More particularly, in FIG. 6, the pin has two steps 160 and 162 on each end, where there is a change in pin diameter. The inner surface of the side plate is in contact with the inner step 160 of the pin 134, and prevents motion of the side plate toward the center of the chain, or motion of the pin away from the center of the chain. The outer step 162 of the pin serves to reduce the diameter of the pin further, so that there will not exist a press fit with the side plate in the portion of the pin that extends beyond the side plate, to make chain assembly and maintenance easier. There can or cannot be a press fit between the pin and the side plate between the two steps, as desired.

The bar 170 keeps the two side plates at a fixed distance, and prevents relative motion between the pins and side plates. Instead of the tube, there can be a protrusion 127, as shown in FIG. 12, made integral to the side plate, which has a face contacting the protrusion from the mating side plate. A bolt 178 is still used to keep the side plates from moving away from each other.

Figure 7:
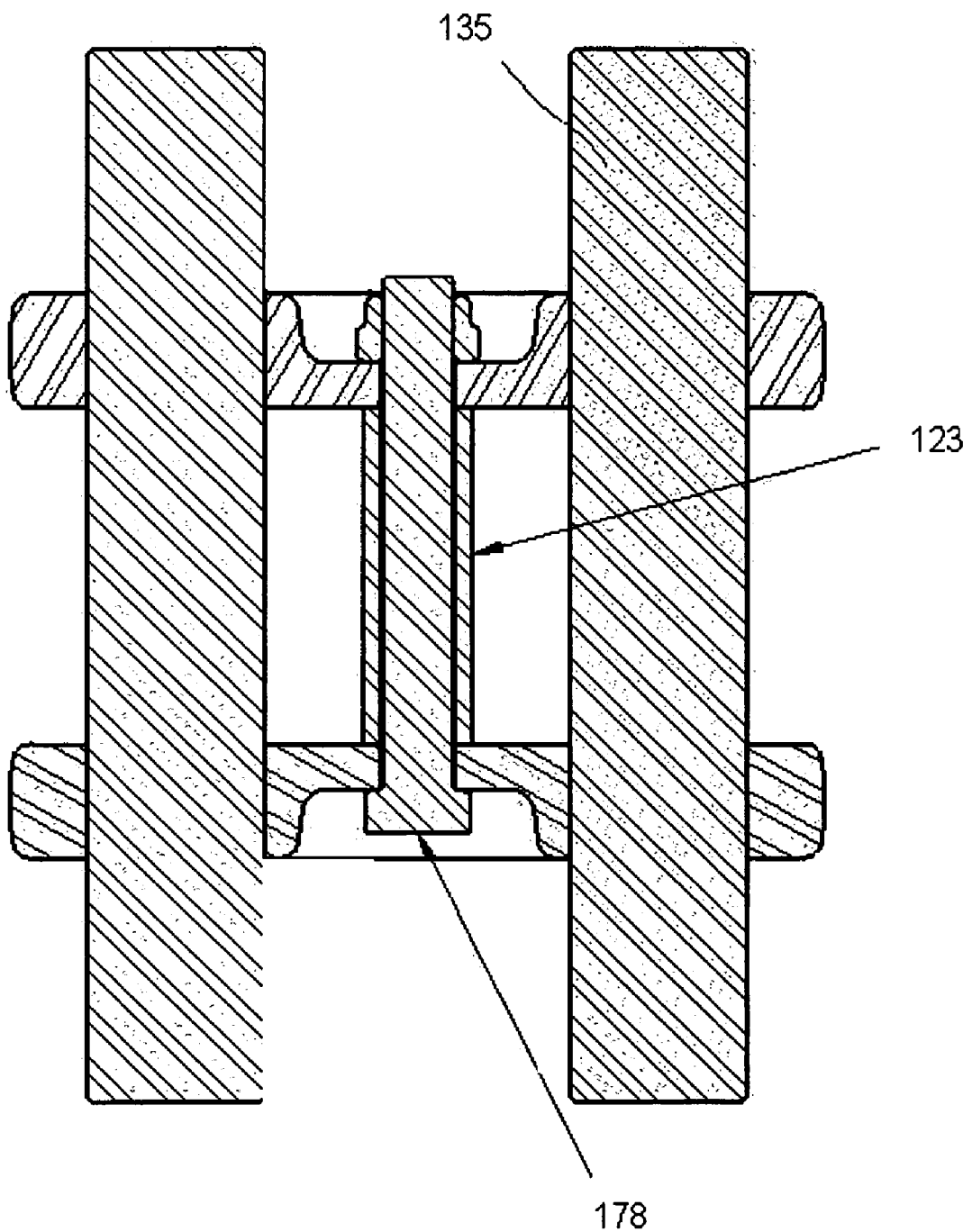
FIG. 7 is a cross sectional view of a second embodiment of the first link assembly.

In FIG. 7, pins 135 have no steps. The pins 135 are held in the side plates by a press fit. The first link assembly does include, however, a means of keeping the two side plates at a fixed distance. In this case, that means is the bar 170 including a bolt 178, nut 119, and tube 123.

In FIG. 8, which is similar to FIG. 7, except that instead of a bolt, nut, and tube, there is a spacer 127 that is attached to the side plate as by welding. This embodiment would likely be used for those links that have scraper flights attached, because those links are never disassembled in service, and they already undergo a welding process to attach the flights.

Figure 9:
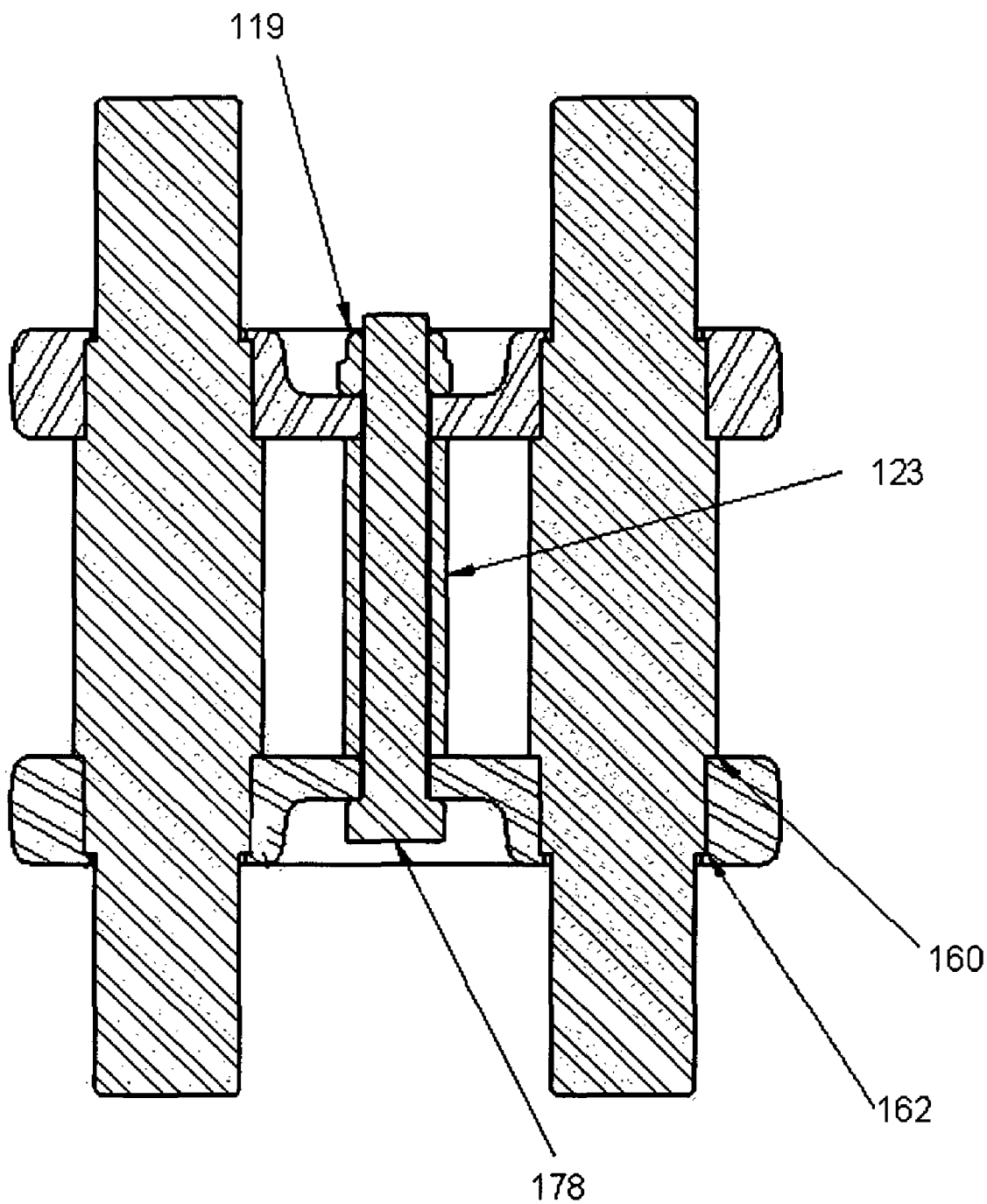
FIG. 9 is a cross sectional view of a fourth embodiment of the first link assembly.

In FIG. 9, the pin has steps, and a step in the side plate opening. The step in the side plate bore contacts the step in the pin. A press fit exists for most of the length of the side plate bore. Outboard of the step in the side plate opening, the bore has a clearance fit with the pin.

Figure 10:
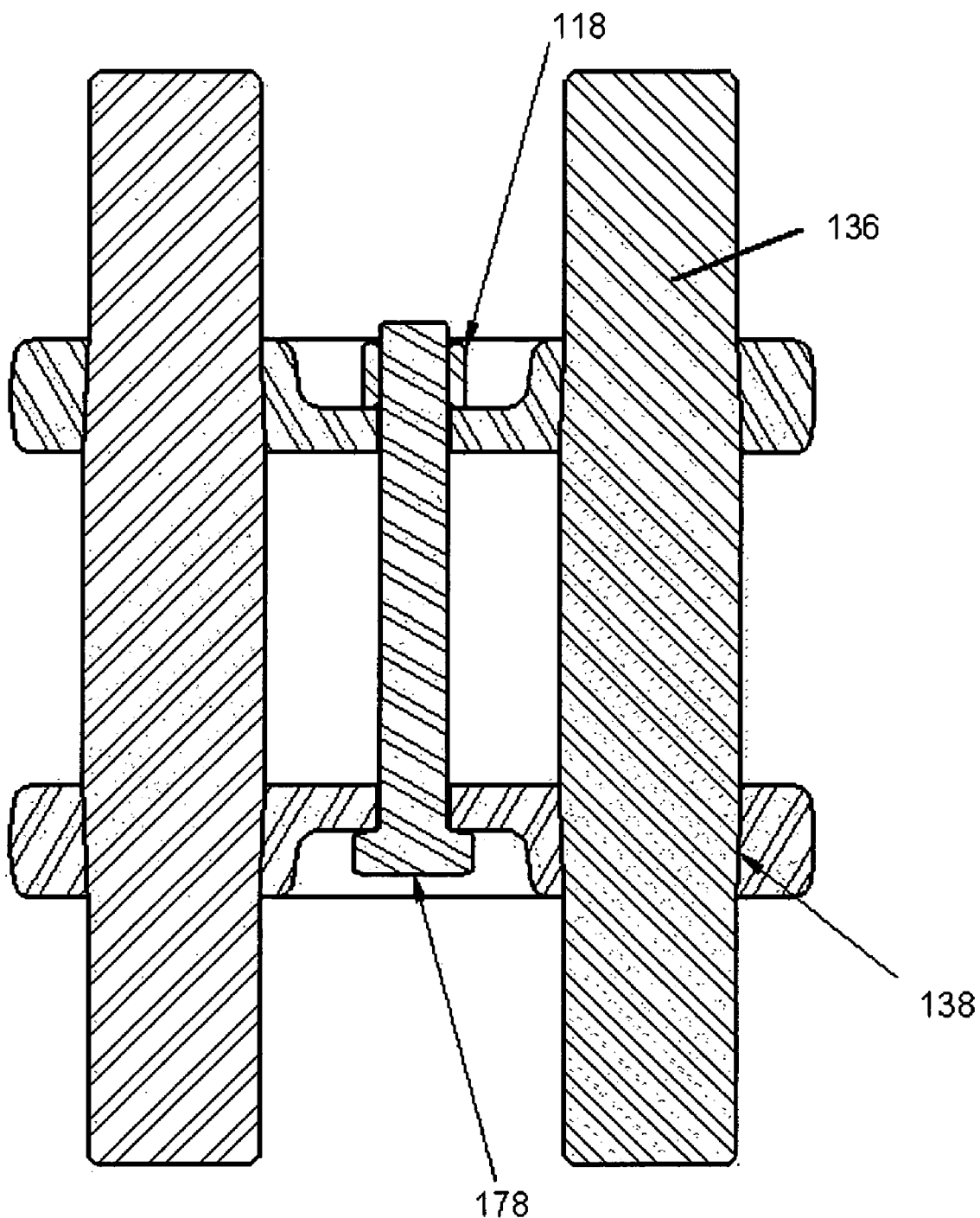
FIG. 10 is a cross sectional view of a fifth embodiment of the first link assembly.

In FIG. 10, the change in diameter in the pins 136 comprises a portion of relatively shallow taper. In the illustration, the total taper is 5 degrees (2.5 degrees from the pin axis to the outer surface). The side plate bores openings are made to a matching taper. A bolt and nut are provided to prevent outward motion of the side plates. The advantage of FIG. 10 is that cylindrical press fits are eliminated, and tightening the bolt and nut can assemble the link assembly. Unthreading the bolt and nut, and tapping one of the side plates with a hammer can disassemble it.

In FIG. 11, which is similar to FIG. 10, a tube 123 is used, as in FIG. 6. The tube length would be dimensioned so that the side plate contacts the pins on the tapers first. Further tightening of the bolt and nut will cause deflection of the side plates until the inner surfaces of the side plates contact the tube. The purpose of the tube is to prevent excess deflection of the side plates due to bolt tension, which would cause improper seating of the tapered fits. It also would serve to reduce fatigue stress on the bolt and side plates.

Various other features and advantages of the invention will be apparent from the following claims.

The invention claimed is:
1. A conveyor including
a pan,
a conveyor chain and flight assembly that travels over said pan, the conveyor chain defining a chain axis, said conveyor chain and flight assembly including
a first link assembly and a second link assembly, each of which includes
two spaced apart drive pins, each of which has a first end and a second end, the drive pins being axially spaced apart,
two spaced apart side plates, each of which has two spaced apart openings, each opening receiving a different one of said drive pins, and
drive pin retaining means for retaining said drive pins in said side plates, and
wherein at least one of said first link assembly and said second link assembly also includes a piece extending between and connected to said side plates to prevent movement of said side plates away from each other, the piece being positioned axially between the drive pins,
means for connecting said two link assemblies, and
a first flight connected to one of said first and said second link assemblies, said flight having a flight head having two spaced apart indentations, each of which receives a different one of said first ends of said drive pins, and
first flight securing means for securing said drive pin first ends in said first flight head so that said first flight head is spaced from its respective side plate, and
a second flight connected to said one of said first and said second link assemblies, said flight having a flight head having two spaced apart indentations, each of which receives a different one of said second ends of said drive pins, and
second flight securing means for securing said drive pin second ends in said second flight head so that said second flight head is spaced from its respective side plate, and
a sprocket drive including two spaced apart drive sprockets, with each drive sprocket engaging said drive pins between said side plates and the side plate's respective flight.

2. A conveyor in accordance with claim 1 wherein said one of said first and said second link assemblies is said second link assembly.

3. A conveyor in accordance with claim 1 wherein said means for connecting said two link assemblies comprises a swivel link.

4. A conveyor in accordance with claim 1 wherein said means for connecting said two link assemblies comprises a solid link providing some limited pivotal movement between said first link assembly and said second link assembly.

5. A conveyor in accordance with claim 1 wherein said drive pin retaining means comprises a shoulder on each pin that engages its respective side plate to prevent said side plates, when said side plates engage said shoulder, from moving towards each other.

6. A conveyor in accordance with claim 5 wherein said shoulder comprises a taper on said pin, and a mating taper on said side plate opening.

7. A conveyor in accordance with claim 5 wherein said shoulder comprises an abutment on said pin.

8. A conveyor in accordance with claim 1 wherein the piece extending between and connected to said side plates to prevent movement of said side plates away from each other includes a bolt having a head engaging one of said side plates and a threaded end.

9. A conveyor in accordance with claim 8 wherein a nut engages the threaded end and engages the other of said side plates.

10. A conveyor in accordance with claim 8 wherein the threaded end threadedly engages the other of said side plates.

11. A conveyor in accordance with claim 8 wherein the head engages an outer surface of the one of said side plates, and wherein a tubular member extends around the bolt and has a first end engaging an inner surface of the one of said side plate and a second end engaging an inner surface of the other of said side plates.

12. A conveyor in accordance with claim 1 wherein each side plate defines a periphery, and wherein the piece is positioned within the periphery of the side plates.

13. A conveyor in accordance with claim 12 wherein a first plane is tangent to the two spaced apart drive pins, wherein a second plane is tangent to the two spaced apart drive pins and spaced from the first plane, and wherein the piece is between the first plane and the second plane.

14. A chain and flight assembly adapted to travel over a pan, the conveyor chain defining a chain axis, said conveyor chain and flight assembly including
   a first link assembly and a second link assembly, each of which includes
   two spaced apart drive pins, each of which has a first end and a second end, the drive pins being axially spaced apart,
   two spaced apart side plates, each of which has two spaced apart openings, each opening receiving a different one of said drive pins,
   drive pin retaining means for retaining said drive pins in said side plates, and
   wherein at least one of said first link assembly and said second link assembly also includes a piece extending between and connected to said side plates to prevent movement of said side plates away from each other, the piece being positioned axially between the drive pins,
   means for connecting said two link assemblies, and
   a first flight connected to one of said first and said second link assemblies, said flight having a flight head having two spaced apart indentations, each of which receives a different one of said first ends of said drive pins, and
   first flight securing means for securing said drive pin first ends in said first flight head so that said first flight head is spaced from its respective side plate, and
   a second flight connected to said one of said first and said second link assemblies, said flight having a flight head having two spaced apart indentations, each of which receives a different one of said second ends of said drive pins, and
   second flight securing means for securing said drive pin second ends in said second flight head so that said second flight head is spaced from its respective side plate.

15. A chain and flight assembly in accordance with claim 14 wherein said one of said first and said second link assemblies is said second link assembly.

16. A chain and flight assembly in accordance with claim 14 wherein said means for connecting said two link assemblies comprises a swivel link.

17. A chain and flight assembly in accordance with claim 14 wherein said means for connecting said two link assemblies comprises a solid link providing some limited pivotal movement between said first link assembly and said second link assembly.

18. A chain and flight assembly in accordance with claim 14 wherein said drive pin retaining means comprises a shoulder on each pin that engages its respective side plate to prevent said side plates, when said side plates engage said shoulder, from moving towards each other.

19. A chain and flight assembly in accordance with claim 18 wherein said shoulder comprises a taper on said pin, and a mating taper on said side plate opening.

20. A chain and flight assembly in accordance with claim 18 wherein said shoulder comprises an abutment on said pin.

21. A chain and flight assembly in accordance with claim 14 wherein the piece extending between and connected to said side plates to prevent movement of said side plates away from each other includes a bolt having a head engaging one of said side plates and a threaded end.

22. A chain and flight assembly in accordance with claim 21 wherein a nut engages the threaded end and engages the other of said side plates.

23. A chain and flight assembly in accordance with claim 21 wherein the threaded end threadedly engages the other of said side plates.

24. A chain and flight assembly in accordance with claim 21 wherein the head engages an outer surface of the one of said side plates, and wherein a tubular member extends around the bolt and has a first end engaging an inner surface of the one of said side plate and a second end engaging an inner surface of the other of said side plates.

25. A chain and flight assembly in accordance with claim 14 wherein each side plate defines a periphery, and wherein the piece is positioned within the periphery of the side plates.

26. A chain and flight assembly in accordance with claim 25 wherein a first plane is tangent to the two spaced apart drive pins, wherein a second plane is tangent to the two spaced apart drive pins and spaced from the first plane, and wherein the piece is between the first plane and the second plane.

27. A chain and flight assembly adapted to travel over a pan, the chain and flight assembly defining a chain axis, the assembly comprising:
   a first sub-assembly including
   two spaced apart first drive pins, each of which has a first end and a second end, the drive pins being axially spaced apart, two spaced apart first side plates, each of the two spaced apart first drive pins extending through and being retained in the two spaced apart first side plates, a first flight having a first flight plate receiving the first end of each of the two spaced apart first drive pins, the first flight being secured to the two spaced apart first drive pins, a surface of the first flight plate facing generally toward and being in spaced relation from an associated one of the two spaced apart first side plates, and a second flight having a second flight plate receiving the second end of each of the two spaced apart first drive pins, the second flight being secured to the two spaced apart first drive pins, a surface of the second flight plate facing generally toward and being in spaced relation from the other of the two spaced apart first side plates;

a second sub-assembly including two spaced apart second drive pins, each of which has a first end and a second end, two spaced apart second side plates, each of the two spaced apart second drive pins extending through and being retained in the two spaced apart second side plates;

at least one of the first sub-assembly and the second sub-assembly including a member extending between and connected to each side plate of the associated one of the two spaced apart first side plates and the two spaced apart second side plates to prevent movement of each side plate of the associated one of the two spaced apart first side plates and the two spaced apart second side plates away from the other, the member being positioned axially between the drive pins; and a connecting link operable to connect the first sub-assembly and the second sub-assembly.

28. A chain and flight assembly in accordance with claim 27 wherein, in at least one of the first sub-assembly and the second sub-assembly, each drive pin of the associated one of the two spaced apart first drive pins and the two spaced apart second drive pins has a shoulder engaging a respective side plate to prevent each side plate of the associated one of the two spaced apart first side plates and the two spaced apart second side plates from moving towards the other.

29. A chain and flight assembly in accordance with claim 27 wherein each of the two spaced apart first side plates has two spaced apart openings, each opening receiving a different one of the first drive pins.

30. A chain and flight assembly in accordance with claim 27 wherein each of the first flight plate and the second flight plate has two spaced apart openings, each opening receiving a different one of the first drive pins.

31. A chain and flight assembly in accordance with claim 27 wherein each side plate defines a periphery, and wherein the member is positioned within the periphery of the side plates.

32. A chain and flight assembly in accordance with claim 31 wherein a first plane is tangent to the two spaced apart drive pins, wherein a second plane is tangent to the two spaced apart drive pins and spaced from the first plane, and wherein the member is between the first plane and the second plane.

33. A chain and flight assembly adapted to travel over a pan, the chain and flight assembly defining a chain axis, the assembly comprising:

a first sub-assembly including two spaced apart first drive pins, each of which has a first end and a second end, two spaced apart first side plates, each of the two spaced apart first drive pins extending through and being retained in the two spaced apart first side plates, a first flight having a first flight plate receiving the first end of each of the two spaced apart first drive pins, the first flight being secured to the two spaced apart first drive pins, a surface of the first flight plate facing generally toward and being in spaced relation from an associated one of the two spaced apart first side plates, and a second flight having a second flight plate receiving the second end of each of the two spaced apart first drive pins, the second flight being secured to the two spaced apart first drive pins, a surface of the second flight plate facing generally toward and being in spaced relation from the other of the two spaced apart first side plates;

a second sub-assembly including two spaced apart second drive pins, each of which has a first end and a second end, two spaced apart second side plates, each of the two spaced apart second drive pins extending through and being retained in the two spaced apart second side plates;

in at least one of the first sub-assembly and the second sub-assembly, each drive pin of the associated one of the two spaced apart first drive pins and the two spaced apart second drive pins having a shoulder engaging a respective side plate to prevent each side plate of the associated one of the two spaced apart first side plates and the two spaced apart second side plates from moving towards the other; and a connecting link operable to connect the first sub-assembly and the second sub-assembly;

wherein at least one of the first sub-assembly and the second sub-assembly includes a member extending between and connected to each side plate of the associated one of the two spaced apart first side plates and the two spaced apart second side plates to prevent movement of each side plate of the associated one of the two spaced apart first side plates and the two spaced apart second side plates away from the other, the associated one of the two spaced apart first drive pins and the two spaced apart second drive pins being axially spaced apart, the member being positioned axially between the associated one of the two spaced apart first drive pins and the two spaced apart second drive pins.

34. A chain and flight assembly in accordance with claim 33 wherein said shoulder comprises a taper on said pin, and a mating taper on said side plate opening.

35. A chain and flight assembly in accordance with claim 33 wherein said shoulder comprises an abutment on said pin.

36. A chain and flight assembly in accordance with claim 33 wherein said connecting link includes a swivel link.

37. A chain and flight assembly in accordance with claim 33 wherein said connecting link includes a solid link providing some limited pivotal movement between the first sub-assembly and the second sub-assembly.

38. A chain and flight assembly in accordance with claim 33 wherein each of the two spaced apart first side plates has two spaced apart openings, each opening receiving a different one of the first drive pins.

39. A chain and flight assembly in accordance with claim 33 wherein each of the first flight plate and the second flight plate has two spaced apart openings, each opening receiving a different one of the first drive pins.

* * * * *